US006235376B1

(12) United States Patent
Miyazaki et al.

(10) Patent No.: US 6,235,376 B1
(45) **Date of Patent: *May 22, 2001**

(54) DISPLAY LABEL AND METHOD FOR FORMING DISPLAY LABEL

(75) Inventors: Toshihiko Miyazaki, Kawasaki; Kenichi Motomura, Higashiyamato; Makoto Itani, Tokyo, all of (JP)

(73) Assignee: Bridgestone Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/964,634

(22) Filed: Nov. 5, 1997

(30) Foreign Application Priority Data

| | | |
|---|---|---|
| Nov. 6, 1996 | (JP) | 8-294139 |
| Nov. 6, 1996 | (JP) | 8-294140 |
| Feb. 6, 1997 | (JP) | 9-023623 |

(51) Int. Cl.$^{7}$ .................... B32B 3/00; B32B 7/14
(52) U.S. Cl. .................... 428/203; 428/195; 428/204
(58) Field of Search .................... 359/2, 567, 576; 428/195, 200, 203, 204, 207, 336, 349, 354, 698, 423.9, 424.8; 429/167; 152/510, 524, 525

(56) References Cited

U.S. PATENT DOCUMENTS

| | | | | |
|---|---|---|---|---|
| 4,037,008 | * | 7/1977 | Tugwell et al. | 428/200 |
| 4,874,670 | * | 10/1989 | Boon et al. | 428/423.9 |
| 4,967,818 | * | 11/1990 | Gartland et al. | 152/524 |
| 5,160,383 | * | 11/1992 | Gartland et al. | 152/510 |
| 5,198,296 | * | 3/1993 | Suzuki et al. | 428/336 |

(List continued on next page.)

FOREIGN PATENT DOCUMENTS

| | | |
|---|---|---|
| 195 17 050 | 10/1995 | (DE) . |
| 0 388 998 | 9/1990 | (EP) . |
| 0 476 470 A2 | 3/1992 | (EP) . |
| 0 605 819 A2 | 7/1994 | (EP) . |
| 2 018 718 | 10/1979 | (GB) . |
| 59-55483 | 3/1984 | (JP) . |

(List continued on next page.)

OTHER PUBLICATIONS

60–187539, Japan, Published unexamined patent application, Sep. 25, 1985.*

*Primary Examiner*—William Krynski
*Assistant Examiner*—B. Shewareged
(74) *Attorney, Agent, or Firm*—Sughrue, Mion, Zinn, Macpeak & Seas, PLLC

(57) ABSTRACT

A method of forming a display label for displaying predetermined information on a member on which display information is to be displayed which member is elastic or expandable/contractible, comprising the steps of laminating at least a protective layer which is made of an elastic material and an expandable/contractible material, a display layer for displaying display information which is formed by at least one of a picture pattern, a letter, a symbol, a photograph, a pattern and a bar code, and a base material layer which is made of an elastic material or an expandable/contractible material, in that order, applying, to a member on which display information is to be displayed, a display label which is formed by the laminating of the protective layer, the display layer and the base material layer, and in which a supporting member is laminated on a surface of the protective layer so as to be peelable off of the protective layer such that the base material layer faces a member on which display information is to be displayed, and forming the display label on the member on which display information is to be displayed by peeling off only the supporting member from the member on which display information is to be displayed.

18 Claims, 8 Drawing Sheets

U.S. PATENT DOCUMENTS

| | | | | |
|---|---|---|---|---|
| 5,312,712 | * | 5/1994 | Will et al. | 429/167 |
| 5,456,969 | * | 10/1995 | Suzuki et al. | 428/195 |
| 5,513,019 | * | 4/1996 | Cueli | 359/2 |
| 5,786,836 | * | 7/1998 | Glennon, Jr. | 347/171 |
| 5,815,292 | * | 9/1998 | Walters | 359/2 |

FOREIGN PATENT DOCUMENTS

| | | | |
|---|---|---|---|
| 60-187539 | * | 9/1985 | (JP) . |
| 60-278979 | * | 9/1985 | (JP) . |
| 5-90539 | | 12/1993 | (JP) . |
| 07 257049 | * | 10/1995 | (JP) . |
| 7-306642 | | 11/1995 | (JP) . |

* cited by examiner

DISPLAY LABEL AND METHOD FOR FORMING DISPLAY LABEL

BACKGROUND OF THE INVENTION

1. Field of the Invention

The present invention relates to a display label and a method of forming a display label.

2. Description of the Related Art

Conventionally, various design patterns such as picture patterns, letters, symbols, photographs, or the like have been displayed as visually identifiable information on a member which is referred to hereinafter as a “member on which the information is to be displayed”. This visually identifiable information (display information) may be, for example, a logo or the like which is directly applied to a tire or the like. In a case in which a logo or the like is displayed on a tire, the logo is stamped on the tire. More specifically, a patterned mold, which forms the pattern of the information to be displayed (display information), is formed within a mold which is used for the vulcanization of a tire. The green tire, which has already been subjected to a forming process, is placed into the patterned mold when the green tire is to be vulcanized. Simultaneously with the vulcanization of the tire, the surface of the tire is pressed onto the inside surface of the patterned mold due to the pressure from the internal portion of the tire so that letters or the like can easily be stamped on the surface of the tire.

Further, the aforementioned design patterns can be displayed by using a display label. For example, when a design pattern is displayed on a tire, a display label is applied to the surface of a tire during a vulcanization process of the tire. To this end, a display label is formed by using a heat resistant synthetic resin film as a base material. The display label is attached at a predetermined position of the tire while the tire is subjected to a vulcanization process (see Japanese Patent Application Laid-Open (JP-A) No. 59-55483).

A bar code label for a tire is a way in which information about the tire can be read and by which respective manufactured products can be managed during the production process or the distribution process thereof. The bar code label for a tire is attached to an unvulcanized green tire which has been subjected to a forming process, when the green tire is vulcanized, and is fixed to a tire during the vulcanization process. The bar code label for a tire can be attached to portions of a tire so as to extend from each bead portion to each side portion (but not at the tread portion). However, in a case in which the bar code labels are attached to the bead portions of a tire, rubber may flow during the vulcanization of the tire, thereby causing displacement of a position of the tire at which the label is attached. Accordingly, it is desirable that labels are attached at the side portions of the tire.

An example of the above-described type of bar code label is the symbol display label disclosed in Japanese Patent Application Laid-Open (JP-A) No. 59-55483. In this symbol display label, a rubber-based base material layer made of a crosslinked or semi-crosslinked rubber material is laminated on a rubber-based adhesive layer. Because the rubber-based base material layer is crosslinked before the vulcanization of the tire, the symbol display label is prevented from being deformed due to rubber flow during the vulcanization process of the tire, reading of the lot number of the tire is facilitated.

Japanese Utility Model Application Laid-Open (JP-U) No. 5-90539 discloses a display label which is structured by forming a heat transfer ink layer on the surface of a surface roughened, hardened resin membrane which has been formed on the surface of a heat resistant synthetic resin film. Accordingly, the heat transfer ink penetrates through the surface roughened, hardened resin membrane on the surface of the display label and strongly adheres so that printing can be carried out by using a heat transfer printer at the place of production. Moreover, since the display label has a rough surface which is made from a hardened resin membrane, the heat transfer ink is prevented from directly contacting the metal surface of a vulcanization mold and adhering thereto. As a result, a clear (legible) label can be formed.

Japanese Patent Application Laid-Open (JP-A) No. 7-306642 discloses a bar code label comprising a plastic film which includes a white filler and whose melting point is a temperature of 200° C. or more. A surface of the film is subjected to a mat mold process and a rubber-based adhesive layer is provided on the other surface via a primer layer. Since the bar code label includes the plastic film, there is no heat deformation, such as shifting of positions, wrinkles, or the like, during the vulcanization process of the tire. Accordingly, at the place of production, the bar code label can be applied onto the surface of the plastic film at which the mat mold process has been effected, by being printed by using a heat transfer printer and an ink ribbon. Moreover, since a rubber-based adhesive layer is provided on the other surface of the plastic film via a primer layer, the bar code label is strongly adhered to a green tire during temporary attachment of the label to the tire and during the vulcanization process of a tire. Accordingly, phenomena such as shifting of positions or the like are not caused at the formed tire.

However, as described above, in a case in which a design pattern for displaying visible information is stamped on the surface of a tire, there arises a drawback in that a patterned mold must be manufactured for each design pattern. For this reason, the greater the number of types of display information, the larger the number of patterned molds. Accordingly, the manufacturing cost of a mold itself becomes expensive. Further, even when a portion of display information needs to be modified, a new mold must be manufactured. As a result, the expensive manufacturing cost of the mold leads to an expensive manufacturing cost of the tire.

The display label uses as a base material a heat resistant synthetic resin film which can expand and contract only slightly. Accordingly, there is a problem in that when a portion of a tire or the like on which display information is to be displayed is distorted, the display label deforms, a gap is formed between the display label and the surface of the portion of a tire or the like on which the display information is to be displayed, and the display label is liable to peel away from the aforementioned portion of the tire. Namely, even when a display label is attached to an expandable/contractible member on which display information is to be displayed, the display label cannot expand and/or contract in accordance with the expandability/contractibility of the member on which display information is to be displayed, and thus, the display label may peel off of the surface of the member on which display information is to be displayed. As a result, it becomes difficult to directly identify display information on the member on which display information is to be displayed.

SUMMARY OF THE INVENTION

In view of the aforementioned facts, it is an object of the present invention to provide a display label which, without leading to high costs and without peeling off, allows for semi-permanent identification of display information which is at least one of a picture pattern, a letter, a symbol, a photograph, a pattern and the like.

A first aspect of the present invention is a display label comprising a display layer, display information formed by at least one of a picture pattern, a letter, a symbol, a photograph, a pattern, and a bar code being displayed on one surface of the display layer, a protective layer which is laminated on the one surface of the display layer and is made of an elastic or expandable/contractible material, and a base material layer which is laminated on another surface of the display layer and is made of an elastic or expandable/contractible material.

A second aspect of the present invention is a bar code label comprising a bar code layer, bar code information being displayed on one surface of the bar code layer, a protective layer which is made of an elastic or expandable/contractible material and is laminated on the one surface of the bar code layer, and a base material layer which is made of an elastic or expandable/contractible material and is laminated on another surface of the bar code layer.

In accordance with the first aspect of the present invention, because display information which is formed by at least one of a picture pattern, a letter, a symbol, a photograph, and a pattern is displayed on the display layer, it is not necessary to effect stamping of or writing on the member on which display information is to be displayed. Accordingly, the time and labor involved in manufacturing a patterned mold for applying display information can be eliminated.

Further, in accordance with the first and second aspects of the present invention, the display layer or the bar code layer is sandwiched between the protective layer, which is made of a material having elasticity or expandability/contractibility and which protects the display information or bar code information, and the base material layer, which is made of a material having elasticity or expandability/contractibility and which is a base material on which the information of the display layer or the bar code layer is formed. Because materials having elasticity or expandability/contractibility are provided at both surfaces of the display layer or the bar code layer, the display layer or the bar code layer is provided with expandability/contractibility. A "material having elasticity or expandability/contractibility" includes both materials which are elastic or expandable/contractible and materials which are elastic and expandable/contractible.

As a result, when a member to whose surface the display label or the bar code label is applied deforms, the display label or the bar code label expands and/or contracts in accordance with this deformation. For this reason, even when the member on which display information or bar code information is to be displayed is an elastic or expandable/contractible material, e.g., a rubber-based material or the like, there is no distortion between the display label or the bar code label and the member on which display information or bar code information is to be displayed during contraction/expansion of the member on which display information or bar code information is to be displayed.

Therefore, regardless of the expandability/contractibility of a member on which display information or bar code information is to be displayed, the display label or the bar code label does not peel off of the member on which display information or bar code information is to be displayed. Even when a member on which display information or bar code information displayed has a large deformation amount, the bar code label or the display label applied thereto can be used semi-permanently.

Moreover, the display label for displaying various design patterns such as picture patterns, letters, symbols, photographs, or patterns can be manufactured inexpensively and efficiently. Further, the display information which is displayed when a display label is provided on a member can be made to be visually identifiable semi-permanently.

Display information which can be displayed on a display label is formed by at least one of a picture pattern, a letter, a symbol, or a photograph. Accordingly, for example, a picture pattern may be displayed in combination with letters. These information are limited to information which is visually identifiable to a human, and do not include information such as a bar code or the like which can be identified by a machine.

Further, the display label or the bar code label includes at least the base material layer which is made of an elastic or expandable/contractible material, the display layer or the bar code layer, and the protective layer which is made of an elastic or expandable/contractible material. Moreover, any other layers can be added to the aforementioned layers provided that they do not impede the expandability/contractibility of a member on which display information or bar code information is to be displayed. For example, an adhesive layer may be provided on the surface of the base material layer on which the display layer or the bar code layer is not placed. Accordingly, adhesiveness can be improved between the display label or the bar code label and the surface of a member on which display information or bar code information is to be displayed. Further, in order to facilitate expansion/contraction of the display layer or the bar code layer in accordance with the expansion/contraction of a member on which display information or bar code information is to be displayed, preferably, the display label or the bar code label does not have any other layers between the base material layer, the display layer or the bar code layer, and the protective layer. Most preferably, the display label or the bar code label includes only three layers which are the base material layer, the display layer or the bar code layer, and the protective layer.

Preferably, the elongation of an elastic or expandable/contractible material used for the protective layer and the base material layer is greater than or equal to that of a member on which bar code information or display information is to be displayed. The elongation of the protective layer and the base material layer can be adjusted by adjusting the composition of the materials used for the protective layer and the base material layer in accordance with the material of the member on which bar code information or display information is to be displayed. More preferably, the elastic or expandable/contractible materials for the protective layer and the base material layer have an elongation of about 20% or more.

A third aspect of the present invention is a display label according to the first aspect further comprising a supporting member which is laminated on a surface of the protective layer and can be peeled off of the protective layer.

A fourth aspect of the present invention is a bar code label according to the second aspect further comprising a supporting member which is laminated on a surface of the protective layer to be peelable off of the protective layer.

In accordance with the third and fourth aspects of the present invention, because the supporting member is laminated on the surface of the protective layer to be peelable therefrom, the supporting member can be peeled off of the display label or the bar code label. For this reason, since the display label or the bar code label is provided with the supporting member, the configuration of the display label or the bar code label can be maintained. Further, the display label or the bar code label can expand/contract due to the protective layer and the base material layer (each of which is made of an expandable/contractible material), by the supporting member being peeled off of the display label or the bar code label. Moreover, by laminating the supporting member on the surface of the protective layer, it is possible to more effectively protect the protective layer which protects the display layer or the bar code layer. In this way, due to the supporting member, the configuration and the condition of the surface of the display label or the bar code label can be maintained. Further, the display label or the bar code label can be handled easily, and after the supporting member has been peeled off of the display label or the bar code label, the label may expand/contract in accordance with the expansion/contraction of a member on which display information or bar code information is to be displayed. As a result, the display label or the bar code label can be employed semi-permanently even for a member which deforms greatly when used.

A fifth aspect of the present invention is a method of forming a display label for displaying predetermined information on a member on which display information is to be displayed which member is elastic or expandable/contractible, comprising the steps of laminating at least a protective layer which is made of an elastic material and an expandable/contractible material, a display layer for displaying display information which is formed by at least one of a picture pattern, a letter, a symbol, a photograph, a pattern, and a bar code, and a base material layer which is made of an elastic material or an expandable/contractible material, in that order, applying, to a member on which display information is to be displayed, a display label which is formed by the laminating of the protective layer, the display layer and the base material layer, and in which a supporting member is laminated on a surface of the protective layer so as to be peelable off of the protective layer such that the base material layer faces a member on which display information is to be displayed, and forming the display label on the member on which display information is to be displayed by peeling off only the supporting member from the member on which display information is to be displayed.

A sixth aspect of the present invention is a method of forming of a bar code label for displaying predetermined information on a member on which bar code information is to be displayed which member is elastic or expandable/contractible, comprising the steps of laminating at least a protective layer which is made of an elastic material or an expandable/contractible material, a bar code layer for displaying bar code information, and a base material layer which is made of an elastic material or an expandable/contractible material, in that order, applying, to a member on which display information is displayed, a bar code label, which is formed by the laminating of the protective layer, the display layer and the base material layer and in which a supporting member is laminated on a surface of the protective layer so as to be peelable off of said protective layer such that the base material layer faces a member on which bar code information is to be displayed, and forming the bar code label on the member on which bar code information is to be displayed by peeling off only the supporting member from the member on which bar code information is to be displayed.

In accordance with the fifth aspect of the present invention, the display label is formed on a member on which display information is to be displayed, which member is elastic or expandable/contractible. The display label has a display layer which is sandwiched between the protective layer and the base material layer. The display layer displays display information which is formed by at least one of a picture pattern, a letter, a symbol, a photograph, and a pattern and which can be identified visually by a human. Accordingly, when the display information is displayed on the member on which display information is to be displayed, the time and labor needed for manufacturing a patterned mold for the display information can be eliminated.

Display information can be input to a computer in advance or can be created on the display screen of a computer. Display information thus created can easily be printed and recorded on the protective layer by the control of a computer.

In accordance with the fifth and the sixth aspects, due to the display label or the bar code label, the display label or the bar code label can expand/contract in accordance with the expansion/contraction of the member on which display information or bar code information is to be displayed. Further, because the supporting member is laminated on the surface of the protective layer of the display label or the bar code label so as to be peelable off of the display label or the bar code label, the configuration and the condition of the surface of the display label or the bar code label can be maintained and the display label or the bar code label can be handled easily. The display label or the bar code label is attached to a member on which display information or bar code information is to be displayed such that the base surface side faces the member on which display information or bar code information is to be displayed. Accordingly, when the label is attached to the member, the supporting member is positioned at the top surface of the display label or the bar code label, and can be peeled off of the label easily.

As a result, it becomes possible to easily provide a display label or a bar code label which can be handled easily and which is able to expand/contract in accordance with the expansion/contraction of a member on which display information or bar code information is to be displayed.

In this way, in accordance with the present invention, since information is displayed on the display layer or the bar code layer, writing or stamping information directly on a rubber-based member on which display information or bar code information is to be displayed is no longer needed to provide information visually identifiable to a human. Therefore, the display label or the bar code label for displaying various design patterns such as picture patterns, letters, symbols, photographs, patterns, or the like, or a bar code, or the like on a rubber-based member can be manufactured easily and inexpensively. Moreover, the display label or the bar code label can be easily formed on a member on which display information or bar code information is to be displayed, and can expand/contract in accordance with the expansion/contraction of the member on which display information or bar code information is to be displayed so that the display label or the bar code label does not peel off of the member on which display information or bar code information is to be displayed.

The supporting member may be formed in a flat plate shape or may have a curved surface provided that each of the above-described layers can be laminated thereon. The supporting member is selected in accordance with the configuration of the surface of the area of a member on which display information or bar code information is to be displayed, to which area the supporting member is attached. For example, in a case in which a supporting member is attached to the surface of a member having a curved surface, it is possible to select in advance a supporting member having a curved surface and corresponding to the configuration of the surface of the aforementioned member on which information is to be displayed. On the other hand, a member on which display information or bar code information is to be displayed is a member having elasticity or expandability/contractibility. Any members having elasticity or expandability/contractibility can be employed. For example, member formed of a rubber-based material can be used.

Further, the timing at which the supporting member is peeled off of the label can be selected in accordance with the standpoints of protection of the protective layer and ease in handling the display label. For example, in a case in which a predetermined process is effected on both the display label or the bar code label having the supporting label and on the member on which display information or bar code information is to be displayed, after the predetermined process has been effected, the supporting member can be peeled off of the display label or the bar code label. Accordingly, during the predetermined process, the protective layer of the display label or the bar code label can be protected. For example, a display label or a bar code label is attached to a member on which information is to be displayed which is made of a rubber-based material and which has not yet been vulcanized. Thereafter, the label is vulcanized together with the member on which information is to be displayed. In this case, the supporting member can be peeled off of the display label or the bar code label after vulcanization. Alternately, during another predetermined process which is effected after the display label or the bar code label has been attached to the member on which display or bar code information is to be displayed, in a case in which the member on which display information or bar code information is to be displayed has a large amount of deformation, the supporting member can be peeled off of the display label or the bar code label before this other predetermined process is effected. Accordingly, during the predetermined process, expanding/contracting of the display label or the bar code label in accordance with the expansion/contraction of the member on which display information or bar code information is to be displayed is not hindered. As a result, the display label or the bar code label does not peel off of the member on which display information or bar code information is to be displayed.

As described above, in accordance with the present invention, since information formed by at least one of a picture pattern, a letter, a symbol, a photograph, and a pattern is displayed on the display layer, it is not necessary to manufacture a patterned mold for information, and display information which can be visually identified by a human being can be displayed effectively on a member on which display information is to be displayed. Further, layers each made of an elastic and expandable/contractible material are provided at both sides of the display layer or the bar code layer, the display label or the bar code label can be provided with expandability/contractibility. Accordingly, the display label or the bar code label can easily expand/contract in accordance with the deformation of a member on which display information or bar code information is to be displayed, and there is no distortion. As a result, the display label or the bar code label can be manufactured inexpensively and can provide information visually identifiable to a human being. Further, even when the display label or the bar code is applied to a member having a large amount of deformation or a portion of a member having a large amount of deformation, essential information such as a picture pattern, a letter, a photograph, a pattern or the like can be made to be visually identifiable semi-permanently.

Moreover, because the supporting member is laminated on the surface of the protective layer of the display label or the bar code label so as to be peelable therefrom, the configuration of the display label and the condition of the surface of the display label or the bar code label can be maintained, and it is easy to handle the display label or the bar code label. After the supporting member has been peeled off of the display label or the bar code label, the display label or the bar code label expands/contracts in accordance with the expansion/contraction of a member on which display information or bar code information is to be displayed. Accordingly, the display label or the bar code label is not distorted, and can be semi-permanently employed even for a member which deforms greatly during use. As a result, it is possible to provide a display label or a bar code label which can be easily handled, which is difficult to damage, and which can be used and stored for a long time.

DESCRIPTION OF THE PREFERRED EMBODIMENT

With reference to the drawings, a first embodiment of the present invention will be explained hereinafter.

Figure 1:
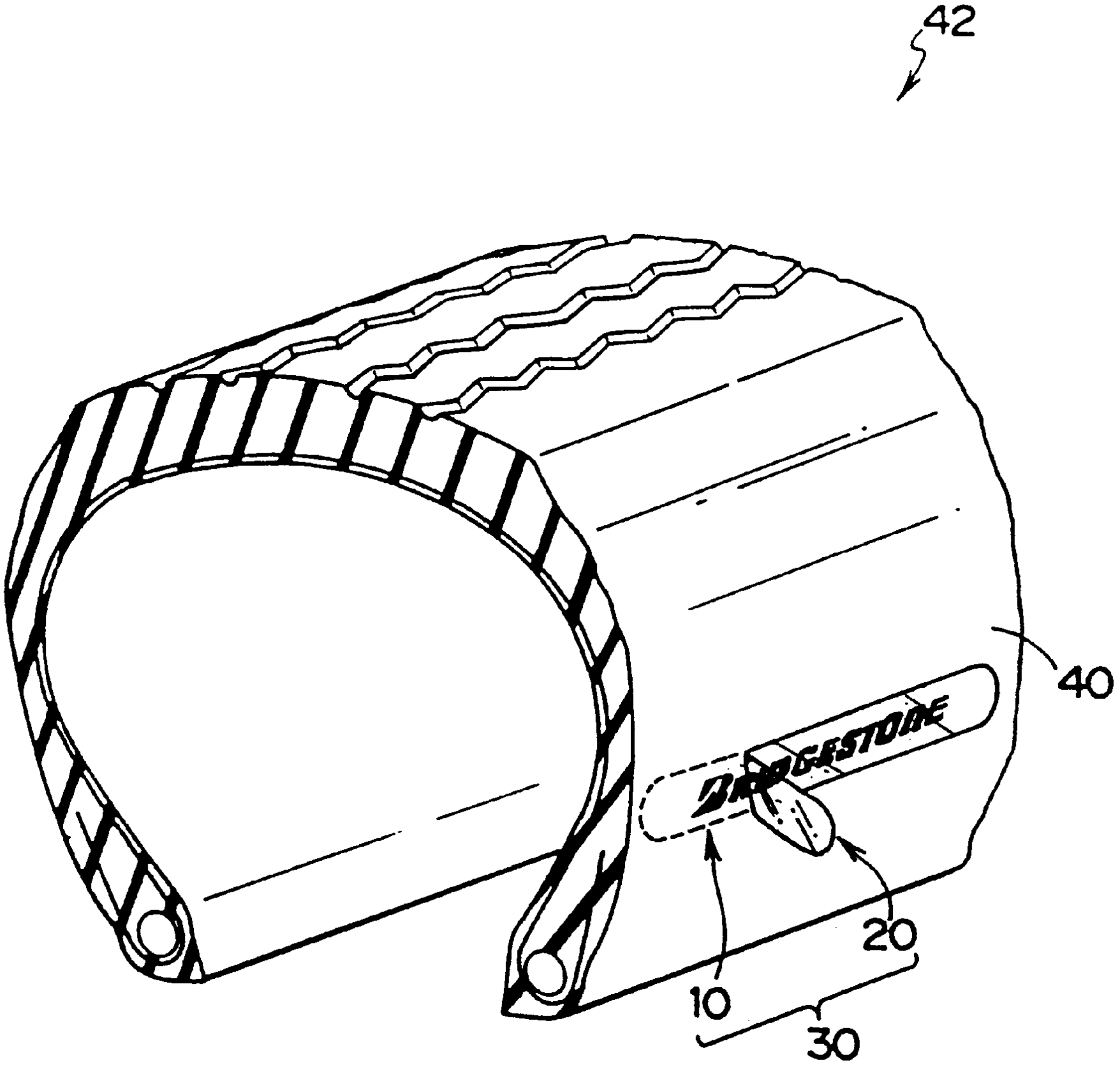
FIG. 1 is a partial perspective view of a tire to which a display label according to a first embodiment of the present invention is attached.

A display label 10 relating to the present invention is shown in FIG. 1 and displays as display information a red and black logo. The display label 10 is integrally adhered to a supporting cover 20 and is attached to one or both of side portions 40 of a tire 42 as a covered display label 30.

Figure 2A:
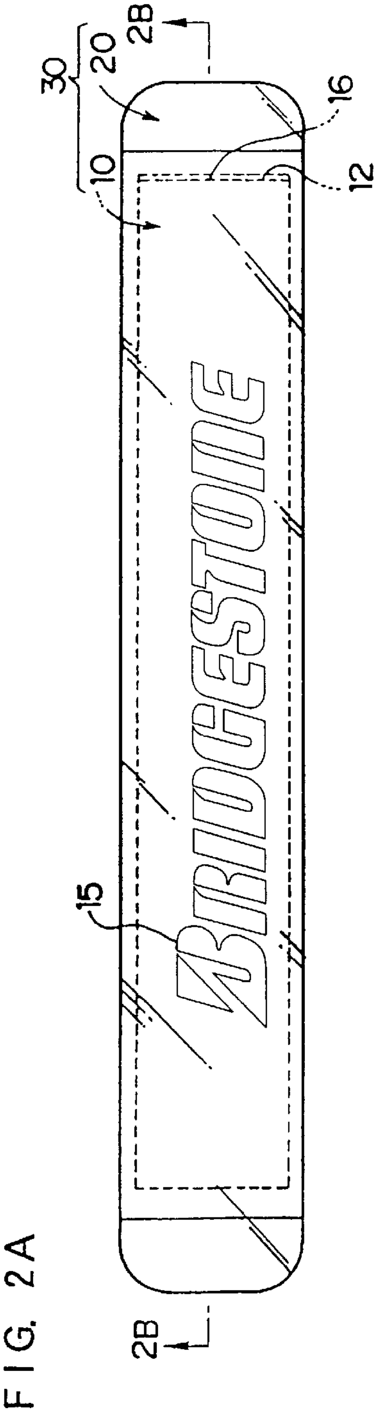
FIG. 2A is a plan view of a covered display label according to a first embodiment of the present invention.
Figure 2B:
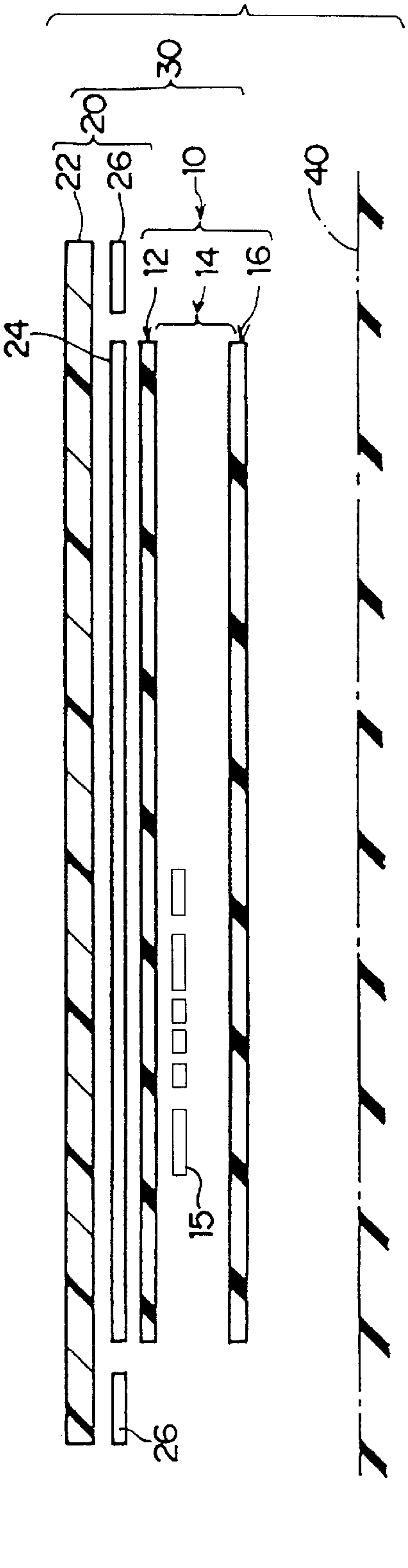
FIG. 2B is a cross sectional view taken along line 2B—2B in FIG. 2A.

As shown in FIG. 2B, the display label 10 is formed in a rectangular configuration whose right and left direction in the figure is the longitudinal direction thereof (see FIG. 2A). The display label 10 is structured by laminating a protective layer 12, a display layer 14, and a base material layer 16 in that sequential order from the supporting cover 20 side.

The protective layer 12, which is the layer of the display label 10 positioned closest to the supporting cover 20 side, is made of an elastic or expandable/contractible material. The protective layer 12 is placed on the entire surface of the display layer 14 to protect the display layer 14. In the same manner as the protective layer 12, the base material layer 16 is made of an elastic or expandable/contractible material, and is disposed beneath the entire under surface of the display layer 14 in FIG. 2.

The material used for the protective layer 12 and the base material layer 16 may include: various types of resins such as urethanes, acrylics, vinyl chloride-vinyl acetates, polyesters, celluloses, epoxys, melamines, polyols, alkyds, rosins or the like, or various types of rubbers such as natural rubbers, synthetic rubbers or the like as a main component; and other additives such as crosslinking agents, crosslinking accelerators, or the like. However, from the standpoint of the adhesiveness of the member on which display information is to be displayed, it is preferable to use urethanes. Further, for the protective layer 12 and the base material layer 16, a rubber material may be used in which various types of rubbers such as natural rubbers, synthetic rubbers or the like are used as a main component, and other additives such as crosslinking agents, crosslinking accelerators, or the like are used. Among these materials, it is preferable to use liquid urethanes for easy formation of both the protective layer 12 and the base material layer 16. Various additives can be added to these materials in order to make them resistant to heat, ozone, and deterioration over time.

Preferably, the material for forming the protective layer 12 and-the base material layer 16 has elongation (elasticity or expandability contractibility) which is greater than or equal to that of the rubber material at the surface of the side portion 40 of the tire 42 (see FIG. 1) to which the display label 10 is attached. Accordingly, even when the side portion 40 of the tire 42 deforms, the protective layer 12 and the base material layer 16 can expand and/or-contract in accordance with deformation. In a case in which the elongation of the material for forming the protective layer 12 and the base material layer 16 is smaller than that of the rubber material at the surface of the side portion 40 of the tire 42, the shearing force at the adhering interface portion between the display label 10 and the surface of the side portion 40 of the tire 42 cannot be reduced sufficiently, which is not preferable. More specifically, it is preferable that the elongation of the material used for the protective layer 12 and the base material layer 16 is 20%. With an elongation of 20%, the display label 10 can be effectively applied to, for example, a rubber composition comprising, as a main component, a polymer such as natural rubber, synthetic rubber or the like which is ordinarily used for the side portion 40 of the tire 42, and comprising additives such as carbon black, zinc oxide, stearin acid, antioxidant, sulfur, and the like. The above-described elongation can be ensured by adjusting the composition of the material.

Additives such as vulcanizing agents, vulcanizing accelerators or the like may be added to the base material layer 16. In a case in which such additives are added to the base material layer 16, during the vulcanization of the tire 42 after the display label 10 has been attached to the surface of the side portion 40 of the tire 42, a cooperative vulcanization is carried out so that the rubber surface of the tire 42 and the base material layer 16 can be strongly adhered to each other. Such vulcanizing agents and vulcanizing accelerators include sulfurs, denatured alkyl phenol resins, or the like, and can be added in an amount of 1–15 parts by weight to 100 parts by weight of the rubber material.

Further, various additives can be added to the materials employed for the protective layer 12 and the base material layer 16 in order to provide the layers with various characteristics.

The thickness of both the protective layer 12 and the base material layer 16 depends on the material of a member to which the display label 10 is adhered, the thickness of the other layer, and the like. However, during the application process, the thickness of the protective layer 12 is generally about 10–100 μm, and preferably about 20–60 μm. During the application process, the thickness of the base material layer 16 is generally about 10–100 μm, and preferably about 20–60 μm. Further, when the protective layer 12 and the base material layer 16 are dried, the thickness of each of the protective layer 12 and the base material layer 16 is reduced to about ⅕ to ⅒ of the aforementioned thickness during application. When the thickness of both the protective layer 12 and the base material layer 16 is larger than the aforementioned ranges of thickness, unevenness during application may be caused. After application, it is difficult for each of the layers to dry, and after drying, the layers is liable to peel off from the member to which the display label 10 is adhered. For these reasons, it is not preferable to make the thickness of the protective layer 12 and the base material layer 16 larger than the aforementioned ranges of thickness. On the other hand, when the thickness of each of the protective layer 12 and the base material layer 16 is smaller than the aforementioned ranges of thickness, after drying, each of the protective layer 12 and the base material layer 16 peel easily. Further, unevenness during application may be caused such that there may be places to which the layers are not applied. It may appear that a plurality of holes are formed in the display label 10. As a result, it is not preferable to make the thickness of the protective layer 12 and the base material layer 16 smaller than the aforementioned ranges of thickness.

The base material layer 16 and the protective layer 12 may be opaque, semi-transparent, or transparent in accordance with the state of the display layer 14. The degree of transparency for the protective layer 12 and the base material layer 16 can be arbitrarily selected provided that the display information formed at the display layer 14 in ink 15 (which will be described later) can permeate through the protective layer 12 and can be discerned.

Further, provided that the display information of the display layer 14 can be read through the protective layer 12, colorants such as pigments or the like can be added to the protective layer 12 and the base material layer 16. Such colorants may be organic pigments, non-organic pigments, carbon, metal powder, or the like. More preferably, the protective layer 12 is transparent and the base material layer 16 is colored by a pigment or the like. In this case, the display information of the display layer 14 can be identified more easily.

In this way, the transparency and color of the protective layer 12 and the base material layer 16 can be selected in combination with each other. For example, in a case in which the ink 15 (which will be described later) for the display layer 14 is black, the base material layer 16 is colored white by a white pigment being added to the base material layer 16, and the protective layer 12 is non-colored transparent. Moreover, when the ink is white, the base material layer 16 may be non-colored transparent, the color of the side portion 40 of the tire 42 to which the display label 10 is attached may be used as a background color, and the protective layer 12 may be non-colored and transparent, or may be colored and transparent so as to show the color of the ink to advantage.

The pigment which is added to the base material layer 16 is determined on the basis of the color of the ink 15 (which will be described later) used for the display layer 14. However, when the ink 15 is black, preferably, the pigment which is added to the base material layer 16 is white. For example, the white pigment may be silica, titanium white, aluminum, zinc white, calcium oxide, or the like. In order to improve the concealing coloration performance of the white pigment, a plurality of types of pigments can be mixed with the white pigment.

The display layer 14 is disposed between the base material layer 16 and the protective layer 12.

The display layer 14 is formed by disposing the ink 15 at predetermined positions of the base material layer 16. The ink 15 is in black and red colors, and is heat-sublimatable by heat transfer. A logo, which serves as display information and which is made of letters, is expressed by the ink 15 on the display layer 14. The display information may include at least one of pictures, characters, symbols, photographs and patterns, other than bar codes. Further, one or two or more colors may be used for the ink 15 to be printed on the display layer 14. The ink 15 is directly adhered to the base material layer 16 due to the adhesive strength of the rubber of the surface of the base material layer 16. For this reason, it is not necessary to form, on the surface of the base material layer 16 to which a pattern is transferred, depressions and protrusions to make the ink 15 adhere better to the base material layer 16.

The thickness of the display layer 14 varies in accordance with the material of the member to which the display label 10 is attached or the thicknesses of the other layers, and the like. However, during the application process, the thickness of the display layer 14 is generally about 10–100 μm, and preferably about 20–60 μm. After drying, the thickness of the display layer 14 is reduced to about ⅕ to 1/10 of the aforementioned ranges of thickness. When the thickness of the display layer 14 is greater than the aforementioned range of thickness, uneven application may be caused. Further, after the display layer 14 has been applied, it is difficult for the layer 14 to dry. Moreover, the thickness of the display layer 14 may vary greatly due to the existence of/lack of the ink 15 such that the display layer 14 peels easily after drying. Accordingly, it is not preferable to make the thickness of the display layer 14 larger than the aforementioned ranges of thickness. On the other hand, when the thickness of the display layer 14 is smaller than the aforementioned ranges of thickness, uneven application may be caused such that there are portions of the display layer 14 which are not applied and it appears as if there are holes formed in portions of the display information, and such that the display layer 14 may peel away from the member to which the display label 10 is adhered. As a result, it is not preferable to make the thickness of the display layer 14 less than the aforementioned ranges of thickness.

The ink 15 used in the display layer 14 is preferably resistant to heat, climate, and light.

The display label 10 is made integral with the supporting cover 20 to form a covered display label 30. The supporting cover 20 covers the entire surface of the display label 10 so as to protect the surface of the protective layer 12 of the display label 10.

The supporting cover 20 includes a heat resistant film 22 at a position corresponding to the outermost layer of the covered display label 30.

The film 22 is a member which is formed in a substantially rectangular configuration whose longitudinal direction is the right and left direction in FIG. 2A. Each of the longitudinal direction side ends of the film 22 has a substantially circular arc shaped configuration. Further, the width and length of the film 22 are larger than those of the display label 10. The display label 10 is disposed at a substantially central portion of the film 22, and the display label 10 is entirely disposed within the range of the film 22. Moreover, the film 22 is a transparent member or semi-transparent member so that the display information of the display label 10 can be discerned through the film 22 when viewed from the film 22 side.

The film 22 may be formed by a material such as polyamide, polycarbonate, polyethylene terephtalate, polybutylene terephtalate, polyphenylene ether, polyphenylene sulfide, polyarylate, polymethyl pentene, polyamide imide, or the like. From the standpoint of heat-resistance, polyethylene telephtalate (PET) is preferably used.

The thickness of the film 22 varies in accordance with the thickness of the display label 10 and the like. From viewpoints of convenience and efficiency, the thickness of the film 22 is generally about 50–400 μm, and preferably about 100–200 μm. It is not preferable for the thickness of the film 22 to fall out of the aforementioned ranges because the film 22 may be wrinkled during the vulcanization of a tire.

A mold release agent layer 24 is provided between the film 22 and the protective layer 12 of the display label 10. The mold release agent layer 24 adheres the film 22 to the protective layer 12 of the display label 10 and is formed by a mold release agent which provides a mold releasing effect at a vulcanization temperature. A known mold release may be used for the mold release agent layer 24, and a silicone-based mold release agent is preferably used.

The mold release agent layer 24 is provided on the protective layer 12 of the display label 10. The thickness of the mold release agent layer 24 depends on the material to which the display label 10 is adhered, the thicknesses of the other layers, and the like and is generally about 10–100 μm, and preferably about 7–20 μm. It is not preferable to make the thickness of the mold release agent layer 24 larger than the aforementioned ranges of thickness because unevenness application may be caused, and after application, it is difficult for the layer 24 to dry. Further, it is not preferable to make the thickness of the mold release agent layer 24 smaller than the aforementioned ranges of thickness because uneven application may be caused such that there are portions to which the layer 24 is not applied and it appears that there are holes, and the mold release agent layer 24 may easily peel off of the protective layer 12.

A pair of adhesive portions 26 are provided at the longitudinal direction end portions of the film 22 which are not in contact with the display label 10 so as to face the side portion 40 of the tire 42. The adhesive portion 26 is made of an adhesive which functions to adhere the longitudinal direction end portions of the film 22 to the surface of the side portion 40 of the tire 42 and to allow the film 22 to be easily peeled off. The adhesive is a compound which can be peeled easily from the surface of the side portion 40 of the tire 42.

Next, a description of formation of the display label 10 will be given hereinafter.

Figure 3:
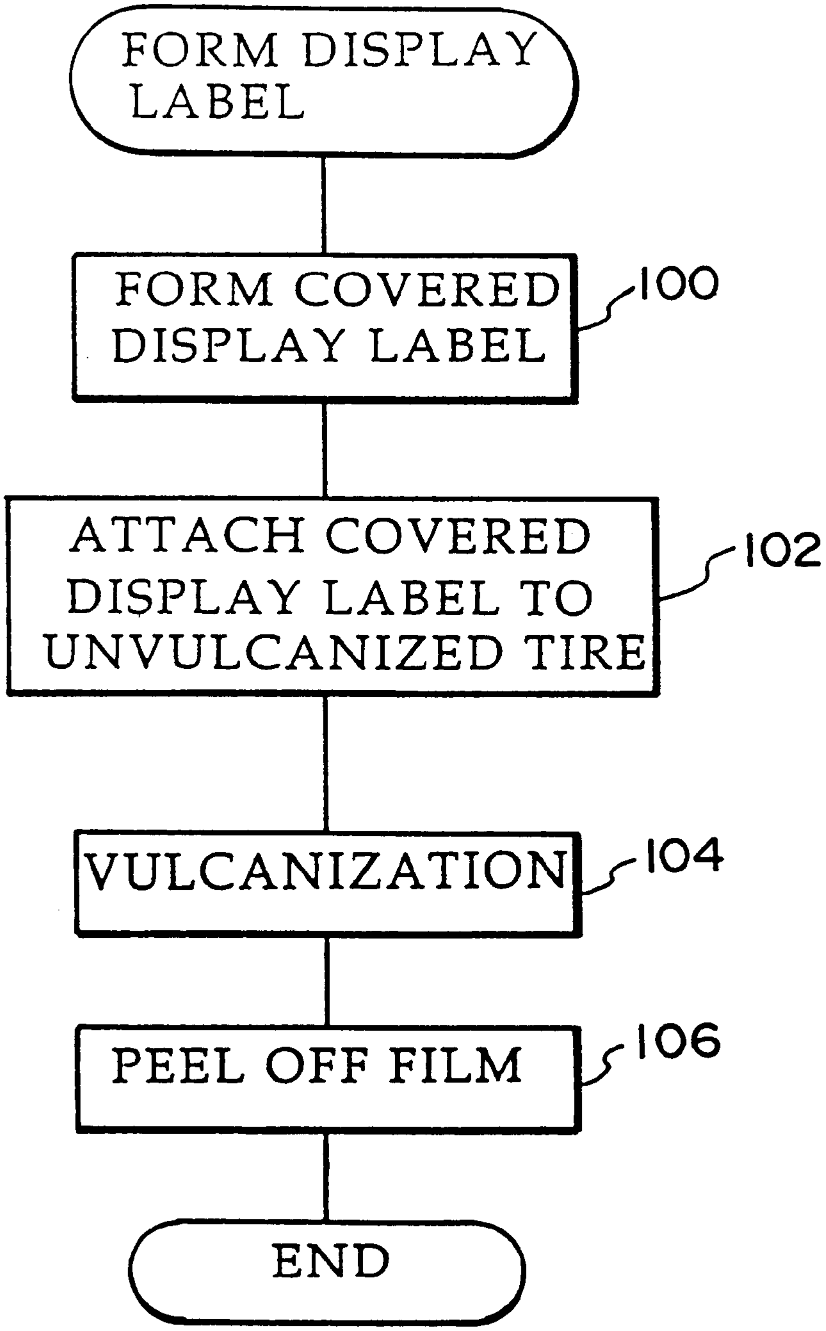
FIG. 3 is a flow chart showing an example of a method of forming a display label according to the first embodiment.

An example of a method of forming the display label 10 is shown in FIG. 3.

In Step 100, each of the protective layer 12, the display layer 14, the base material layer 16, the mold release agent layer 24, and the adhesive portions 26 is applied to the surface of the film 22 so that the covered display label 30 is formed.

The covered display label 30 is manufactured by the mold release agent layer 24, which uses a known mold release agent, being applied to the surface of the film 22 except for the end portions of the film 22, and the mold release agent layer 24 drying. If the mold release agent layer 24 is applied to a thickness of about 20–60 μm, the thickness after drying is about ⅓ of that thickness (i.e., about ⅓ of 20–60 μm). Subsequently, a material selected for use as the protective layer 12 is applied on the mold release agent layer 24 and dried so as to form the protective layer 12.

After the protective layer 12 has been formed, the ink 15 is printed on the protective layer 12 by a heat transfer method so that a logo is recorded on the surface of the protective layer 12. The logo as information data may be input into a computer in advance or may be processed on the display of a computer. The ink is applied to the protective layer 12 and a material selected for the base material layer 16 is applied to the surface of the protective layer 12 to which surface the ink 15 has been applied, and dry so that the base material layer 16 is formed. At this time, the ink 15 is adhered to be interposed between the protective layer 12 and the base material layer 16 so that the display layer 14 is formed.

After the display layer 14 and the base material layer 16 have been formed as described above, an adhesive agent is applied to each of the longitudinal direction end portions of the film 22 so that the adhesive portions 26 are formed.

Figure 4A:
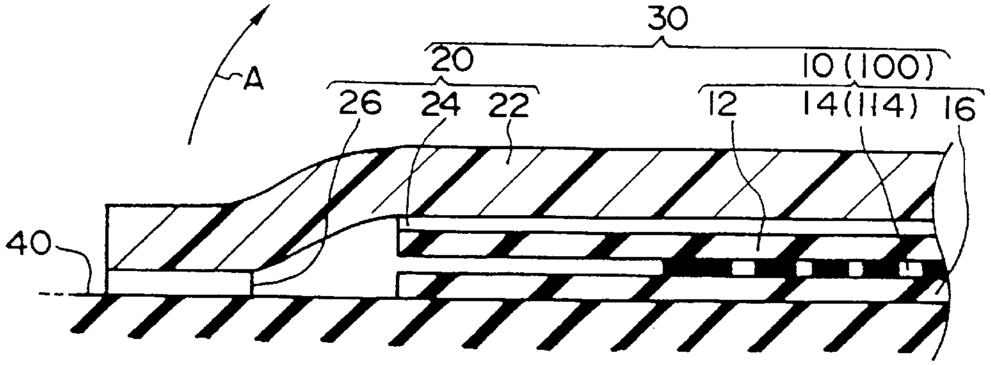
FIG. 4A is a cross sectional view of the covered display label and a member on which display information is to be displayed according to the first embodiment of the present invention.

After the respective agents have been applied for each layer so that the covered display label 30 is formed, in Step 102, the covered display label 30 is attached to the side portion 40 of the tire 42 which has been molded but not yet vulcanized (see FIG. 4A). During the manufacturing process, the base material layer 16 is attached to the tire 42 to face the surface of the side portion 40 of the tire 42 such that the covered display label 30 is the lowermost layer and the film 22 in which the respective agents for each layer have been applied is the uppermost layer. The covered display label 30 is adhered to the side portion 40 of the tire 42 by the adhesive force of the material used for the base material layer 16 and the adhesive force of the adhesive portions 26 formed at he longitudinal direction end portions of the film 22.

The covered display label 30 is attached to the side portion 40 of the tire 42. Thereafter, in Step 104, a vulcanization process is carried out. In the vulcanization process, the tire 42 to which the covered display label 30 has been attached is placed into an ordinary mold, in which the pattern of the information to be displayed is not formed, and is heated to a temperature of about 150–200° C., and vulcanization is effected. At this time, the film 22 of the covered display label 30 is disposed at the mold side. Accordingly, the mold contacts the film 22 of the covered display label 30 and does not contact the surface of the display label 10 so that the surface of the display label 10 is protected.

The rubber of the tire 42 within the mold is vulcanized by heating. In a case in which a vulcanization agent or a vulcanization accelerator is added to the base material layer 16 of the display label 10 which has been attached to the rubber surface of the tire 42, the base material layer 16 is vulcanized together with the rubber surface of the tire 42 so that the base material layer 16 is integrally fixed to the rubber surface of the tire 42. Further, during the vulcanization process, the mold release agent in the mold release agent layer 24 is denatured by the heat, and the adhesive force deteriorates so that the film 22 may be peeled off of the protective layer 12.

Figure 4B:
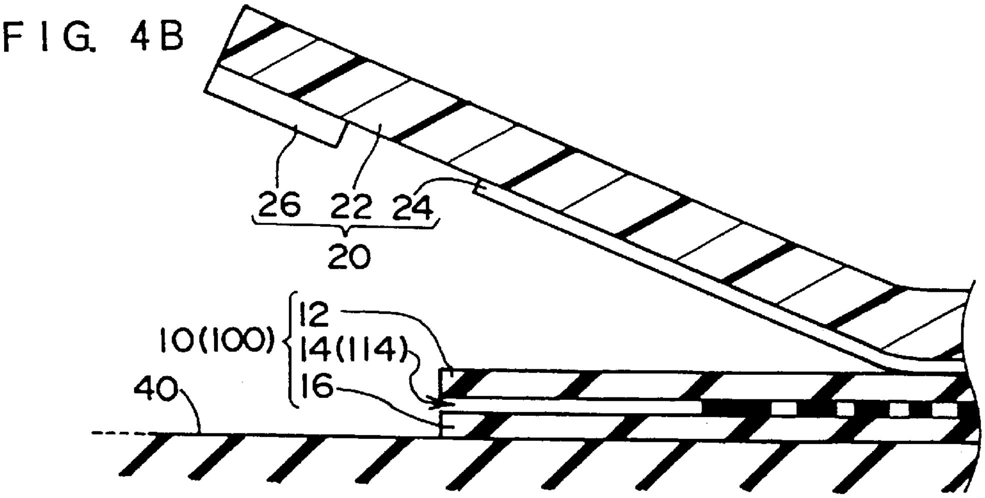
FIG. 4B is a cross sectional view of a covered display label and a member on which display information is to be displayed, in a state in which a supporting cover of the covered display label is peeled off from the display label.

As described above, when the vulcanization process has been completed, the tire 42 is removed from the mold. Thereafter, in Step 106, the film 22 is peeled off of the display label 10 (see FIG. 4B). At this time, it is easy to peel the film 22 from the display label 10 due to the vulcanization process. Further, in a case in which the base material layer 16 is vulcanized together with the tire 42, since the base material layer 16 is fixed to the rubber surface of the tire 42 more strongly, the film 22 can be peeled off of the display label 10 by pulling the film 22 in the direction of moving apart from the rubber surface of the tire 42 (the direction of arrow A in FIG. 4A).

Moreover, the adhesive force of the adhesive agent of the adhesive portions 26 adhering the film 22 and the rubber surface of the tire 42 to each other is smaller than the adhesive force between the base material layer 16 and the rubber surface of the tire 42. Accordingly, the adhesive portions 26 can easily be peeled off of the rubber surface of the tire 42 (see FIG. 4B).

Figure 4C:
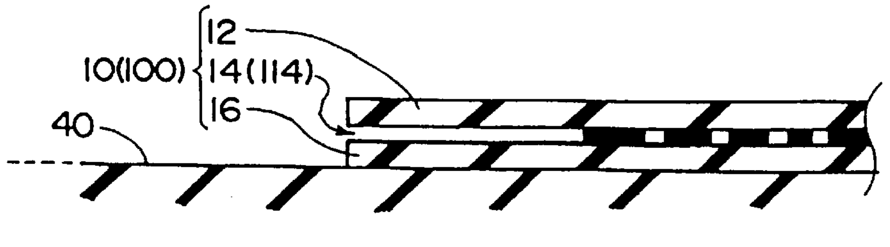
FIG. 4C is a cross sectional view of the display label and the member on which display information is to be displayed.

In this way, by using a mold in which no patterned mold is formed, the display label 10, which is formed by the base material layer 16 and the protective layer 14 both made of an elastic or expandable/contractible materials and by the display layer 14 sandwiched between the base material layer 16 and the protective layer 12 disposed on the surface of the side portion 40 of the tire 42 before vulcanization of the tire 42 (see FIG. 4C). Since the display label 10 comprises the protective layer 12 and the base material layer 16 which are both made of an elastic or expandable/contractible materials and between which the display layer 14 is interposed, even when the side portion 40 of the tire 42 deforms, the display label 10 expands/contracts in accordance with the deformation of the side portion 40 of the tire 42. Accordingly, it is possible to display a visually-discernable logo on the side portion 40 of the tire 42 without manufacturing a patterned mold. Further, since the display label 10 comprises the protective layer 12 and the base material layer 16 each of which is made of an elastic or expandable/contractible material and between which the display layer 14 is interposed, even when the display label 10 is provided at the side portion 40 of the tire 42 which is a region having a large deformation amount, there is no distortion between the surface of the side portion 40 and the base material layer 16 of the display label 10 so that the display label 10 does not peel off of the side portion 40 of the tire 42.

In accordance with the present embodiment, the display label 10 is formed at the side portion 40 of the tire 42 via the base material layer 16. However, more reliable adhesion can be provided between the display label 10 and the surface of the side portion 40 of the tire 42 by providing an adhesive layer at the base material layer 16 and adhering the base material layer 16 to the surface of the side portion 42 via the adhesive layer 12. The adhesive for forming the adhesive layer may be rubber such as solvent type rubbers and emulsion type rubbers or acrylics such as solvent type acrylics, emulsion type acrylics, and hot-melt type acrylics. The adhesive may be arbitrarily selected from thermosetting adhesives and pressure sensitive adhesives. The aforementioned adhesives have a higher adhesiveness than the adhesive which is used at the adhesive portions 26. Accordingly, when the supporting cover 20 is peeled off together with the supporting cover 20, the display label 10 is not peeled off of the surface of the side portion 40.

Further, in accordance with the first embodiment, the film 22 and the side portion 40 of the tire 42 are adhered to each other merely by providing the adhesive portions 26 at the ends of the film 22. However, instead of the adhesive portions 26, a pressure sensitive adhesive double coated tape can be attached to the film 22. Even when a pressure sensitive adhesive double coated tape is provided at the film 22, in the same manner as described above, during the vulcanization process, the film 22 can be made integral with the side portion 40 of the tire 42, and after vulcanization, the film 22 can easily be peeled off of the tire 42.

Further, an aluminum plate to which an adhesive such as the aforementioned adhesives which can be used for the adhesive portions 26 has been applied, may be disposed at the side of the surface of the pressure sensitive adhesive double coated tape which surface is adhered to the side portion 40. Accordingly, during vulcanization, the film 22 can be made integral with the side portion 40 of the tire 42, and after vulcanization, the film 22 can be easily peeled off of the side portion 40. Moreover, after vulcanization, when the film 22 is peeled off of the display label 10, marks left by the pressure sensitive double coated tape can be prevented from being formed on the surface of the side portion 40.

In accordance with the first embodiment, the covered display label 30 is adhered to the side portion 40 of the tire 42 and then inserted into a mold. However, the covered display label 30 may be placed at a predetermined position of the inner surface of the mold and then adhered to the side portion 40 of the tire 42 within the mold. This can be effected by, for example, providing another adhesive layer on the rear surface of the film 22, i.e., the surface which is opposite to the surface on which the display label 10 is formed, and by adhering this adhesive layer to the inner portion of the mold. In this way, if the covered display label 30 is adhered to a predetermined position at the inner portion of the mold, it is not necessary to provide the adhesive portions 26.

In accordance with the first embodiment, the display label 10 for displaying the type of the tire 42 is formed by printing a logo on the display layer 14 so that the type of the tire 42 can be visually identified by a person. However, information other than a logo can be displayed on the display layer 14.

Figure 5:
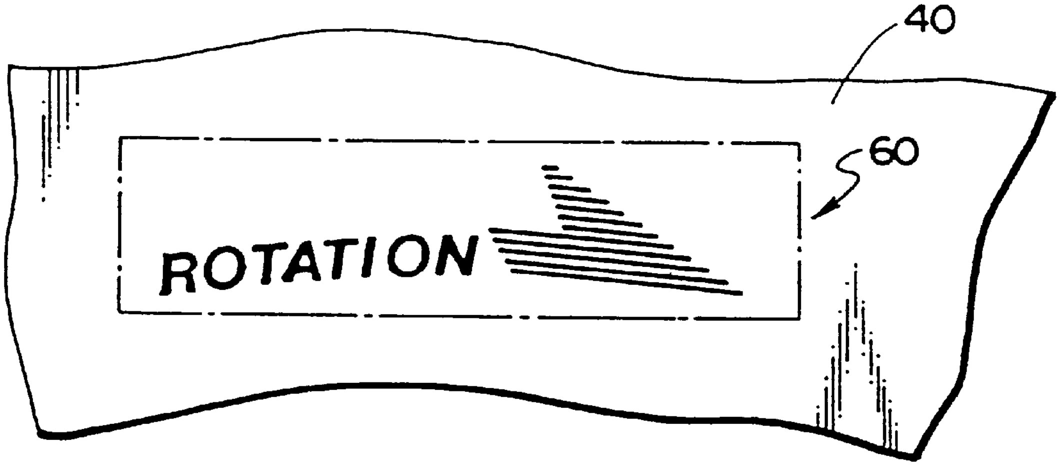
FIG. 5 is a plan view illustrating a variant example of the display label according to the first embodiment of the present invention.

A display label 60 is shown in FIG. 5 and displays an indication mark expressing the rotational direction in which the tire 42 is attached to a vehicle body. The indication mark is formed by letters and a mark. The display label 60 is formed on a specific portion of the side portion 40 of the tire 42 so that necessary information can be easily applied to the position on which the display label 60 is displayed. Accordingly, in a case in which two or more display portions for display labels 60 are provided on the side portion 40 of the tire 42, the display labels 60 may be directly applied to the corresponding positions. Further, when the display position of the display label 60 is changed, the display label 60 can be formed at the new position. Therefore, necessary information can easily be applied to a specific portion of the side portion 40 of the tire 42 without manufacturing a patterned mold. Further, the color effect can be enhanced by printing the letter portions in white ink and by printing the arrow mark portion in yellow ink.

In accordance with the first embodiment, the display label 10 is provided at the side portion 40 of the tire 42 having a large deformation amount. However, the display label 10 can be used in the same manner as described in the first embodiment even when the display label 10 is attached to other rubber products such as a rubber roller or the like. In a case in which the display label 10 is attached to an elastic or expandable/contractible member having a large deformation amount, since the display label 10 deforms in accordance with the large deformation amount, the display label 10 is particularly effective.

Moreover, in accordance with the present embodiment, each of the layers is applied to the film 22 so as to form the covered display label 30. However, each layer can be laminated on the film 22 by adhering a film type member to each layer without using agents having viscosity which allows application.

In accordance with the present first embodiment, because the display label 10 is adhered to the side portion 40 of the tire 42 by vulcanizing the covered display label 30, the heat resistant film 22 is used. However, the present invention is not limited to the heat resistant film 22. For example, in a case in which the covered display label 30 is attached to a member on which display information is to be displayed without being exposed to high temperatures such as temperatures at which vulcanization is effected, the film 22 may be a member which is not resistant to heat and still can be used in the same manner as described above.

An experimental example using the display label 10 is explained hereinafter.

A known mold release agent (for example, a silicone mold release agent) was applied to a thickness of 10 $\mu$m onto a transparent PET film (12×85 mm, thickness: 100 $\mu$m) and dried. A liquid urethane resin was then applied to a thickness of 40 $\mu$m. After the liquid urethane resin dried, a logo in red and black inks was heat-transferred onto the liquid urethane resin layers. A liquid urethane resin to which a white pigment was added was applied to a thickness of 25 $\mu$m film having the logo printed thereon. Accordingly, the covered display label 30 was formed.

The covered display label 30 thus manufactured was attached and pressed to the side portion 40 of the tire 42 which had not been subjected to a vulcanization process but had been subjected to a forming process, such that the PET film side surface of the covered display label 30 was the top surface thereof.

The tire 42 to which the covered display label 30 was adhered was placed into ordinary, non-patterned mold, and was vulcanized at the temperature of 160° C. After 120 minutes passed, the tire 42 was removed from the non-patterned mold, and the transparent PET film was peeled off of the covered display label 30.

The display label 10 displaying the logo as information visually identifiable to a human was thus formed on the side portion 40 of the vulcanized tire 42.

Even when a large amount of deformation is applied to the tire 42 as in a case in which the tire 42 is used for an aircraft or the like, the display label 10 deforms in accordance with the deformation of the side portion 40 of the tire 42 so that the display label 10 does not peel off of the side portion 40. Accordingly, the display label 10 can be used continuously.

As a result, it is possible to form the display label 10 inexpensively and easily. Further, the information displayed on the display label 10 can semi-permanently identified visually. Moreover, noticeable ornamentation can be achieved by displaying colored information on the display label 10.

A second embodiment of the present invention will be explained hereinafter referring to FIG. 6. Portions identical to those shown in the first embodiment are denoted by the same reference numerals and descriptions thereof will be omitted.

In the above-described first embodiment, a single piece of information is expressed by the ink 15 on the display layer 14 of a single display label 10. However, in the second embodiment, two or more pieces of information are printed on a single display layer 14.

Figure 6:
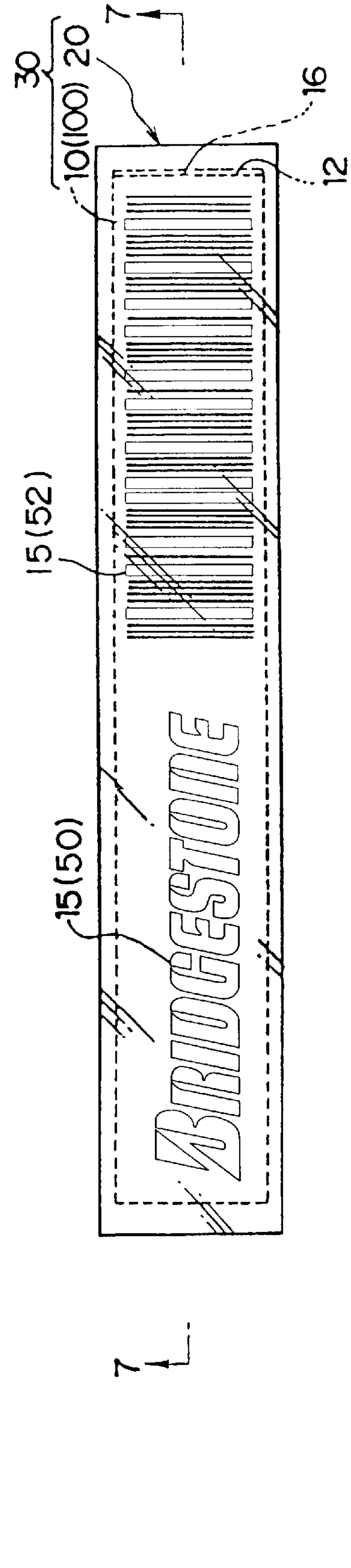
FIG. 6 is a plan view of a display label according to a second embodiment of the present invention.

Namely, as shown in FIG. 6, the left half portion of the display layer 14 is an area on which a logo mark 50 is printed in color. The logo mark 50 expresses the manufacturer or the company to which the product is shipped. The printing on this area functions to display so-called service information which is information used commonly even for a large number of labels. Therefore, a large amount of information can be printed in advance.

On the other hand, the right half portion of the display layer 14 is an area on which a bar code 52 is printed. The bar code 52 is machine readable information for specifying the tire 42 and is printed in black and white. The bar code 52 may have information which differs per tire 42, information which differs per lot, and the like. Accordingly, the logo mark 50 is displayed as service information, whereas the information displayed by the bar code 52 is important information because it is used to determine the maintenance time or the replacing time or the like of the tire 42.

Other than the logo mark 50 of the manufacturer or the company to which the product is shipped, the service information may include letters and a mark indicating the rotational direction of the tire 42 such as in FIG. 5, or the product name. Further, the logo mark 50 can be printed at the right half portion of the display layer 14, and the bar code 52 can be printed at the left half portion thereof. Alternatively, both can be printed in two stages in the vertical direction.

Other than the bar code 52, the important information may be other optically readable information or magnetically readable information.

The second embodiment also differs from the first embodiment in that the adhesive portions 26 are not provided.

Figure 7:
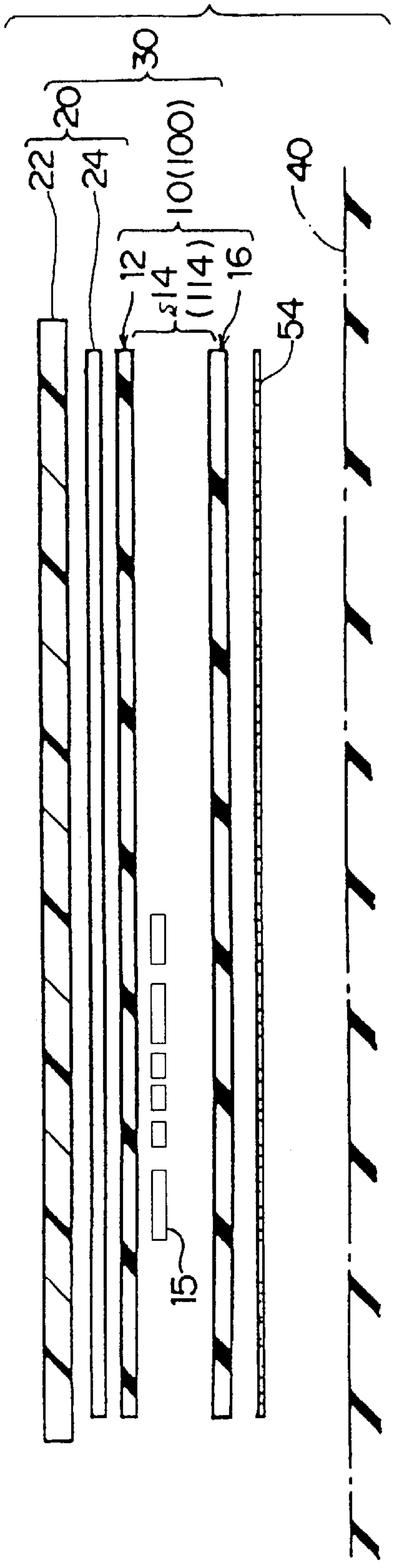
FIG. 7 is a cross sectional view taken along line 7—7 in FIG. 6 of the display label according to the second embodiment.

A cross sectional side view of the display label 10 according to the second embodiment is shown in FIG. 7.

Basically, the display label 10 according to the second embodiment is structured in the same manner as that of the first embodiment which is shown in FIG. 1. However, since the display label 10 of the present second embodiment does not have the adhesive portions 26, the entire length of the display label 10 is made to be shorter than that of the display label 10 according to the first embodiment.

The aforementioned adhesive portions 26 are replaced by adhesive portions 54. As shown in FIG. 7, the adhesive portions 54 are provided directly beneath the base material layer 16 so as to cover the entire rear surface of the base material layer 16.

The adhesiveness increases by providing the adhesive portions 54 on the entire rear surface of the base material layer 16. The display label 10 can be adhered to the side portion 40 of the tire 42 at a predetermined position thereof and maintained at that location.

Further, after the vulcanization of the tire 42, the adhesive portions 54 are melted and the entire display label 10 is embedded into the rubber portion of the side portion 40 of the tire 42. Accordingly, there is no remaining of the adhesive portions 26 nor protrusions and recesses caused by their remaining as in the first embodiment, and the surface of the side portion 40 and the surface of the display label 10 can become coplanar with each other. As a result, the external appearance improves.

Figure 8:
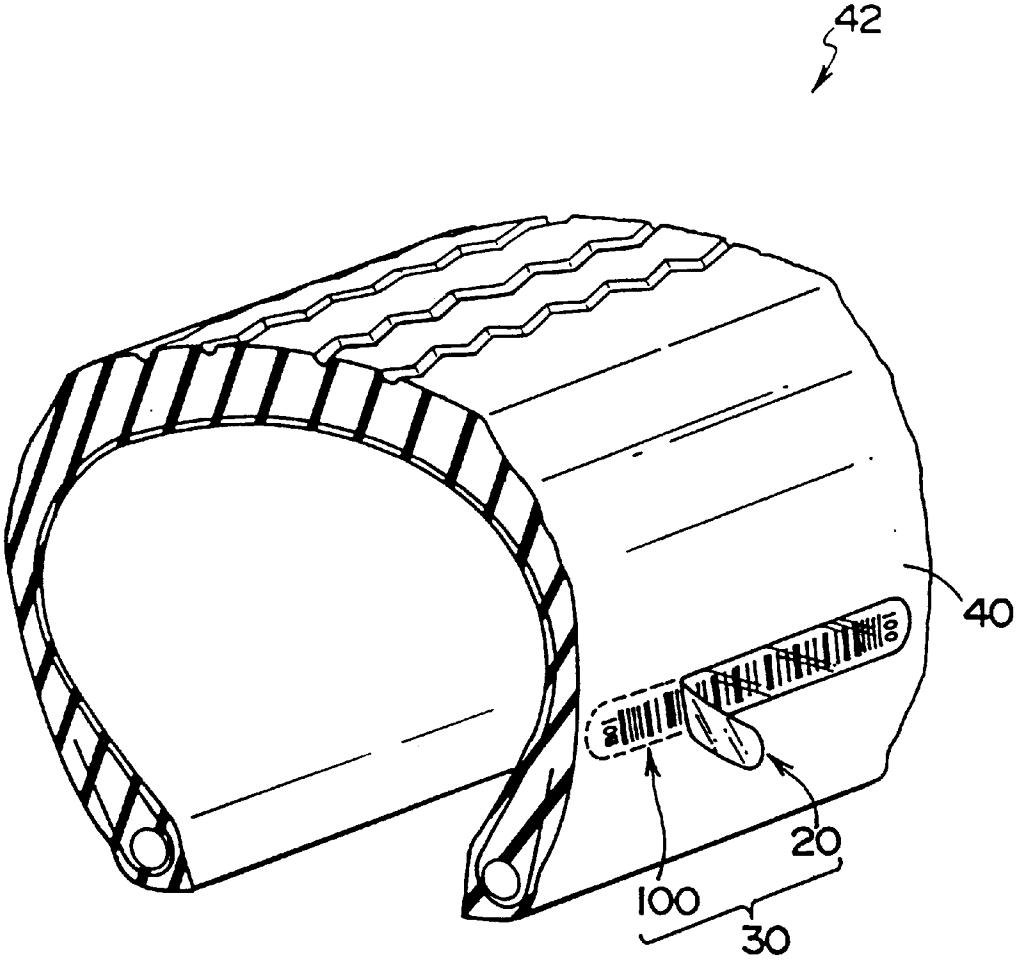
FIG. 8 is a partial perspective view of a tire to which a display label according to a third embodiment of the present invention is attached.

A description of a third embodiment of the present invention will be given hereinafter by referring to FIGS. 8 and 9. Portions identical to those shown in the first embodiment are denoted by the same reference numerals and a description thereof will be omitted.

Figure 9A:
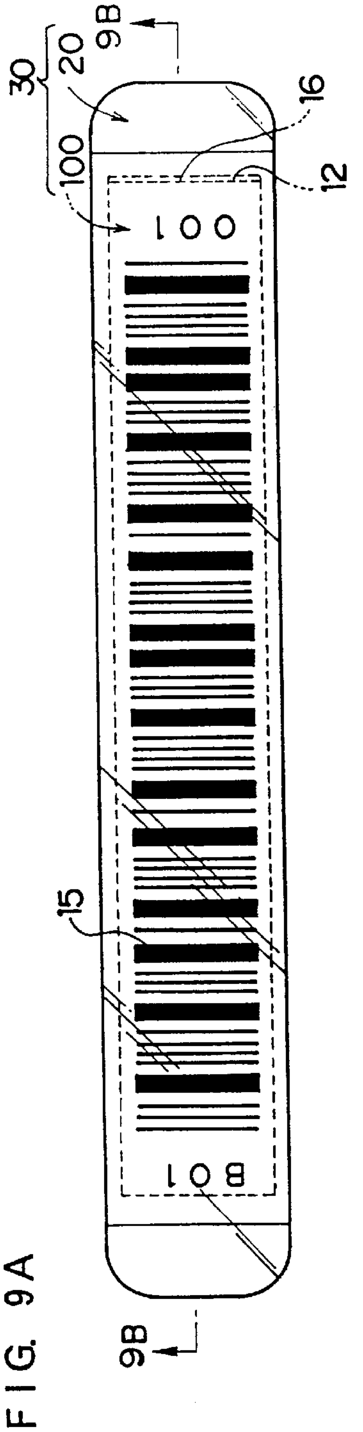
FIG. 9A is a plan view of a covered display label according to a first embodiment of the present invention.
Figure 9B:
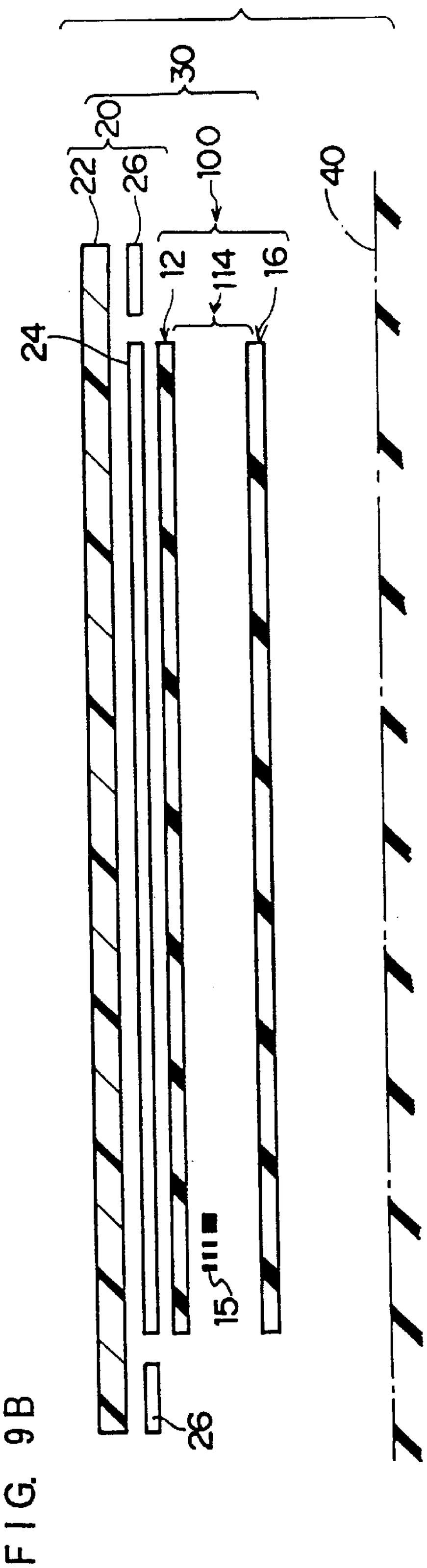
FIG. 9B is a cross sectional view taken along line 9B—9B in FIG. 9A.

In the first embodiment, a logo is printed on the display layer 14 so as to form the display label 10 for specifying the type of the tire 42 or the like. However, the information displayed on the display layer 14 is not limited to a logo. As shown in FIGS. 8, 9A and 9B, there may be provided a bar code label 100 having a bar code layer 114 which is used for the management of respective products or the like during production processes or distribution processes of products. Further, the bar code layer 114 is provided as the display layer, and the bar code label 100 is provided as the display label.

What is claimed is:

1. A display label that is expandable and contractible comprising:

- a display layer, display information formed by at least one of a picture pattern, a letter, a symbol, a photograph, a pattern, and a bar code being displayed on one surface of said display layer;
- a protective layer laminated on one surface of said display layer to cover said display information and said protective layer made of an elastic or expandable/contractible material;
- a supporting member laminated on a surface of said protective layer which can be peeled off of said protective layer; and
- a base material layer laminated on another surface of said display layer and made of an elastic or expandable/contractible material, said base layer to be attached to an expandable member; wherein said display label expands and contracts with any expansion or contraction of said member.

2. A display label according to claim 1, wherein said supporting member has a mold release agent layer which is adhered to the surface of said protective layer loses adhesive strength when heated, and a heat resistant film which is adhered to a surface of said mold release agent layer.

3. A display label according to claim 2, wherein said supporting member has adhesive portions which are disposed in the vicinities of the longitudinal direction end portions of said heat resistant film and are provided on a surface of said supporting member which surface is adhered to said mold release agent layer, said adhesive portions being adhered to a member on which display information is to be displayed.

4. A display label that is expandable and contractible comprising:

- a display layer, display information formed by at least one of a picture pattern, a letter, a symbol, a photograph, a pattern, and a bar code being displayed on one surface of said display layer;
- a protective layer laminated on one surface of said display layer to cover said display information and said protective layer made of an elastic or expandable/contractible material; and
- a base material layer laminated on another surface of said display layer and made of an elastic or expandable/ contractible material, said base layer to be attached to an expandable member; wherein said display label expands and contracts with any expansion or contraction of said member, and a value of elasticity or expandability/contractibility of each of said protective layer and said base material layer is greater than or equal to a value of elasticity or expandability/contractibility of a member on which display information is to be displayed.

5. A display label according to claim 4, further comprising:

a supporting member which is laminated on a surface of said protective layer and can be peeled off of said protective layer.

6. A display label according to claim 4, wherein said display layer is formed by ink which has been transferred onto a predetermined position of said base material layer.

7. A display label according to claim 4, further comprising:

an adhesive layer formed on a surface of said base material layer opposite to a surface of said base material layer on which said display layer is laminated, said adhesive layer improving the adhesive strength of said base material layer.

8. The display label of claim 4, wherein said expandable/contractible material for said protective layer comprises a material selected from the group consisting of resins and rubbers other than plastic.

9. The display label of claim 4, wherein said expandable/contractible protective layer and said base material layer are made from materials exclusive of plastic resin.

10. A bar code label that is expandable and contractible comprising:

a bar code layer, bar code information being displayed on one surface of said bar code layer;

a protective layer which made of an elastic or expandable/contractible material and laminated on one surface of said bar code layer to cover said bar code information;

a support member laminated onto a surface of said protective layer which can be peeled off of said protective layer; and a base material layer made of an elastic or expandable/contractible material and laminated on another surface of said bar code layer, said base material layer to be attached to an expandable member, wherein said display label expands and contracts with any expansion or contraction of said member.

11. A bar code label according to claim 10, wherein said supporting member has a mold release agent layer which is adhered to the surface of said protective layer loses adhesive strength when heated, and a heat resistant film which is adhered to a surface of said mold release agent layer.

12. A bar code label according to claim 11, wherein said supporting member has adhesive portions which are disposed in the vicinities of the longitudinal direction end portions of said heat resistant film and are provided on a surface of said supporting member which surface is adhered to said mold release agent layer, said adhesive portions being adhered to a member on which bar code information is to be displayed.

13. A bar code label that is expandable and contractible comprising:

a bar code layer, bar code information being displayed on one surface of said bar code layer;

a protective layer which made of an elastic or expandable/contractible material and laminated on one surface of said bar code layer to cover said bar code information; and a base material layer made of an elastic or expandable/contractible material and laminated on another surface of said bar code layer, said base material layer to be attached to an expandable member, wherein said display label expands and contracts with any expansion or contraction of said member, and a value of elasticity or expandability/contractibility of each of said protective layer and said base material layer is greater than or equal to a value of elasticity or expandability/contractibility of a member on which bar code information is to be displayed.

14. A bar code label according to claim 13, further comprising:

a supporting member which is laminated on a surface of said protective layer so as to be peelable off of said protective layer.

15. A bar code label according to claim 13, wherein said bar code layer is formed by ink which has been transferred onto a predetermined position of said base material layer.

16. A bar code label according to claim 13, further comprising:

an adhesive layer formed on a surface of said base material layer opposite to a surface of said base material layer on which said bar code layer is laminated, said adhesive layer improving the adhesive strength of said base material layer.

17. The bar code label of claim 13, wherein said expandable/contractible material for said protective layer comprises a material selected from the group consisting of resins and rubbers other than plastic.

18. The bar code label of claim 13, wherein said expandable/contractible protective layer and said base material layer are made from materials exclusive of plastic resin.

* * * * *

UNITED STATES PATENT AND TRADEMARK OFFICE

CERTIFICATE OF CORRECTION

PATENT NO. : 6,235,376 B1
APPLICATION NO. : 08/964634
DATED : May 22, 2001
INVENTOR(S) : Toshihiko Miyazaki, Kenichi Motomura and Makoto Itani It is certified that error appears in the above-identified patent and that said Letters Patent is hereby corrected as shown below:

On title page, item [56]
Under Foreign Patents delete "0 605 819 A2" and insert --0 604 819 A2--.

Signed and Sealed this

Twenty-first Day of August, 2007

JON W. DUDAS
*Director of the United States Patent and Trademark Office*